United States Patent [19]
Pennell

[11] 4,089,697
[45] May 16, 1978

[54] MANUFACTURE OF PORTLAND CEMENT

[75] Inventor: Anthony Robin Pennell, Gravesend, England

[73] Assignee: The Associated Portland Cement Manufacturers Limited, London, England

[21] Appl. No.: 658,824

[22] Filed: Feb. 17, 1976

[30] Foreign Application Priority Data

Feb. 26, 1975 United Kingdom ............ 8032/75

[51] Int. Cl.² .................... C04B 7/02; F27B 15/00
[52] U.S. Cl. .................................... 106/100; 432/14; 432/106; 432/186; 432/190
[58] Field of Search ............ 432/14, 106, 186, 190; 110/15; 106/100

[56] References Cited
U.S. PATENT DOCUMENTS

| 1,605,279 | 11/1926 | Pike | 106/100 |
| 2,214,345 | 9/1940 | Pike | 106/100 |
| 3,782,888 | 1/1974 | Cnare | 432/14 |
| 3,834,860 | 9/1974 | Fukuda | 432/106 |
| 3,861,331 | 1/1975 | Saitoh et al. | 110/40 R |
| 3,920,380 | 11/1975 | Heian | 432/106 |
| 3,946,680 | 3/1976 | Laman | 110/40 R |

Primary Examiner—John J. Camby
Attorney, Agent, or Firm—Diller, Brown, Ramik & Wight

[57] ABSTRACT

A method of calcining solid materials on a downdraught travelling grate prior to treatment at a higher temperature on a continuously operating kiln, wherein heat for said calcining is obtained by drawings hot gaseous effluent from the kiln into the travelling grate through the solids discharge outlet thereof, characterized in that additional heat from an auxiliary source is induced into a downstream portion of the travelling grate.

3 Claims, 1 Drawing Figure

U.S. Patent  May 16, 1978  4,089,697
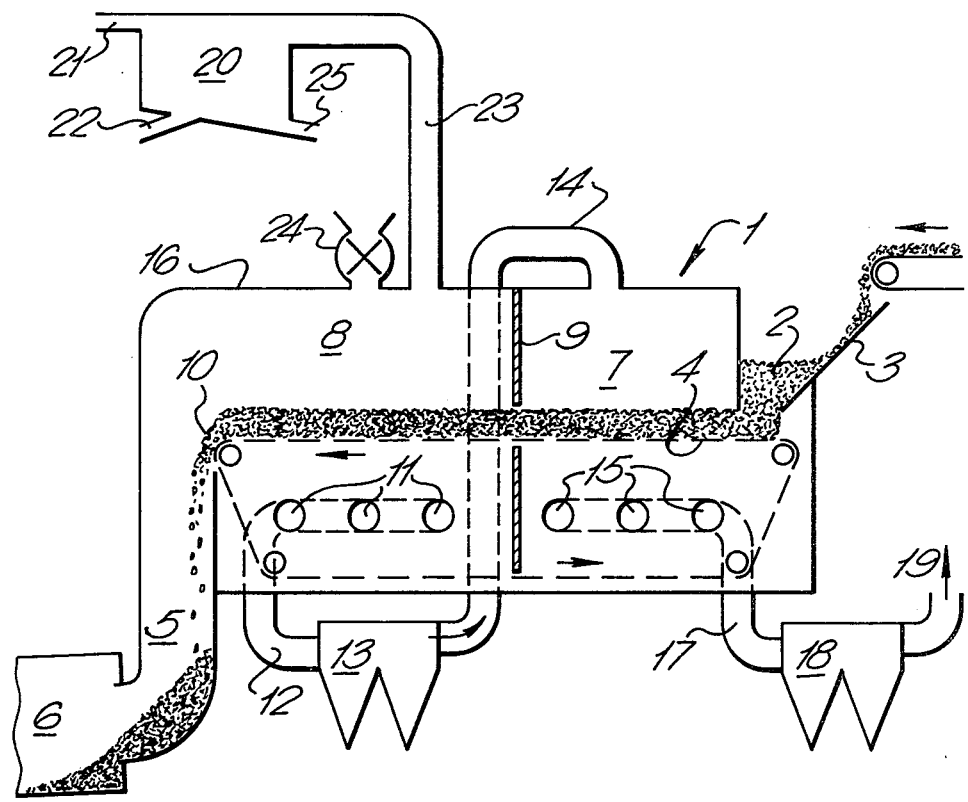

MANUFACTURE OF PORTLAND CEMENT

The present invention relates to calcining solid materials on a travelling grate and more particularly to a method and apparatus of the type in which raw materials for making Portland cement are pre-calcined on a down-draught travelling grate before passing to a rotary kiln for the production of cement clinker. It is to be understood that the travelling grate is enclosed except for charge and discharge openings and gas exhaust ducts.

In a known process of this type, nodulised or granular cement-making raw materials first pass along a travelling grate where drying and partial decarbonation of the raw materials is performed by passing hot gas downwardly through the material on the grate; the solid material thus pre-treated is then allowed to descend through a chute into a rotary kiln where the decarbonation is completed and the clinker finally formed towards the hotter end of the rotary kiln from where it is discharged for cooling. The rotary kiln is conventionally fired by means of a flame fed at the solids discharge end of the kiln for example with pulverised coal as fuel. The hot gas for the travelling grate is provided by drawing the hot gaseous products of combustion from the rotary kiln up through the riser which constitutes the chute, and over and through the grate at least once, by means of one or more induced draught fans.

The rotary kiln fuel flame is thus relied upon for the entire heat supply for the work to be done throughout the rotary kiln and the travelling grate pre-heater. The temperature at the hot end of the rotary kiln may typically be about 1450° C while that at the discharge end of the grate may be of the order of 900° to 1000° C.

The velocity of the hot gas drawn up the riser pipe from the rotary kiln to the grate, and hence the quantity of gas and thereby the grate heat input, is limited for a given fan capacity by at least two factors, namely the gas pressure drop consequent upon the restriction offered by the bed of solid material on the grate to the passage of gas through the bed, and the tendency to raise dust from the rotary kiln up the riser, which is undesirable in itself and also promotes clogging of the travelling bed with consequent increase in the abovementioned restriction. The extent of the pre-treatment, particularly decarbonation, which can be achieved on the travelling grate, is therefore limited.

The degree of decarbonation attainable is in any case dependent on the amount of residual heat available from the rotary kiln after the burning zone, and is accordingly not under direct control. In all cases a considerable amount of decarbonation remains to be completed in the rotary kiln and represents a load on kiln resources, and a determining factor in kiln performance.

It is an object of the invention to provide for increased and controllable decarbonation in the travelling grate pre-heater in a process of the aforesaid type, without incurring disadvantages hitherto entailed by attempts at increased gas flow. It is a further object of the invention to facilitate increased specific output from the process, with consequent improvement in economy in terms both of plant and fuel.

According to the invention we provide a method of calcining solid materials on a downdraught travelling grate prior to treatment at a higher temperature in a continuously operating kiln, wherein heat for said calcining is obtained by drawing hot gaseous effluent from the kiln into the travelling grate through the solids discharge outlet thereof, characterized in that additional heat from an auxiliary source is induced into a downstream portion of the travelling grate.

The invention further provides apparatus for calcining solid materials prior to treatment at a higher temperature in a continuously operating kiln, comprising a downdraught travelling grate adapted to draw hot gaseous effluent from such a kiln through the solids discharge outlet of the grate, characterised in that the grate has means for inducing additional heat from an auxiliary source into a downstream portion of the travelling grate.

The method and apparatus of the invention are especially advantageously applied in the manufacture of Portland cement, the solid materials referred to being cement clinker-forming raw materials and the kiln being a conventional rotary cement kiln.

In a typical plant of the type referred to, the travelling grate may be the well-known "Lepol" grate, preferably having a vertical partition defining an enclosed upstream section and a downstream section through both of which the loaded grate travels, and fitted with an intermediate extraction fan to transfer gas from under the downstream section, by way of cyclones for removal of dust, to above the upstream section, and a final extraction fan to draw gas from under the upstream section. In such a typical plant the additional heat is induced into the downstream section preferably about one fifth to one third of the way from the partition to the grate discharge end.

By means of the invention applied to cement manufacture, a degree of decarbonation may be achieved on the travelling grate as much, for example, as twice that obtained hitherto. Thus an increase from 40 percent decarbonation to 80 percent decarbonation can be attained. An increase of temperature of e.g., 70° – 100° C in the space above the downstream part of the grate may be usefully attained; further increase of temperature above a certain value is liable to cause sticking of the bed material.

The grate restriction and the kiln back end temperature when the additional heat is supplied to the grate, remain similar despite an increase in product output, because the increased share of the decarbonation taken by the preheater occasions a reduced rotary kiln exit gas volume, representing for instance a 30 percent reduction in gas velocity in relation to clinker output, with reduced dust pick up in that gas.

Under the conditions of the process of the invention therefore, a decreased amount of gas is required to be drawn through the junction between the rotary kiln and the travelling grate, i.e., the chute and riser, so that less dust is carried over concomitantly; the amount of dust carried on to the grate is further reduced because the specific dust content of the gas is also lower, being sharply dependent upon gas velocity. Consequently the specific gas restriction through the bed on the travelling grate is reduced by virtue of decreased obstruction or blinding of the bed by dust, and the bed may be usefully increased in depth by increasing the solids feed rate for a given grate speed, thus increasing throughput.

The increased decarbonation in the preheater relieves the rotary kiln of a significant work load and on that account the rotary kiln also produces a substantially increased output, e.g., 10 to 15 percent by weight, without calling for any increase in fuel or other resource such as fan power, leading to improved overall economy despite the additional hot gas supply. Further improvement is possible with increased fan ratings.

If desired, provisions may also be made whereby heat derived from the clinker cooler is transferred by suitable means such as a heat exchanger, to augment the heat supplied to the grate; in any event the invention affords improved distribution of heat supply in relation to demand.

The supply of additional heat to the grate may be derived in many different ways for instance in the form of the hot gaseous combustion product of an auxiliary furnace with appropriate air supply, operating on gaseous, liquid or solid fuel, e.g., heavy or light oil or pulverised coal, the hot combustion product being passed into the space over the downstream section of the grate through a suitable duct. The flame characteristics, burner temperature and flow rate are readily controlled in known manner to provide the additional hot gas at the temperature required over the grate, i.e., of the order of, or up to about 100° C above, that encountered in the known process hitherto.

Alternatively the auxiliary burner may be fired with other low grade fuels, refuse for incineration or other combustible waste materials, and may with advantage take the form of a fluidised bed combustor. In another embodiment, low grade fuel or refuse may be injected onto the bed on the travelling grate itself. By low grade fuel we mean fuel inferior to that used for firing the main kiln.

EXAMPLE

The invention will now be further described by way of example with reference to the accompanying drawing, in which the FIGURE represents a diagrammatic sectional side-elevation of a travelling grate adapted according to the invention.

Referring to the FIGURE, there is represented a travelling grate kiln 1 arranged to receive Portland cement clinker-forming materials 2 in moist nodular form at about 25° C which enter by hopper 3 to form a bed on the grate 4 which is a gas-porous conveyor composed of elements linked together and travelling round a closed path as shown, driven by suitable motor means not shown. The bed is conveyed on the grate and discharged down a chute 5 into a rotary kiln shown partly at 6 for conversion to clinker after completion of the decarbonation reaction which is partly undergone on the grate.

The bed passes through two compartments within a hood 16 enclosing the grate, i.e., an upstream section 7 and a downstream section 8, separated by a vertical partition 9 which allows the bed to pass through.

Effluent gaseous combustion and decarbonation products from the rotary kiln 6 are drawn up the riser constituted by chute 5, at about 950° C over the discharge end 10 of the grate into the space above the grate in downstream section 8, downwards through the bed in this section at about 520° C and into openings 11 leading by ducts represented schematically at 12 into dust separation cyclones 13, under the influence of an intermediate induced draught fan, not shown.

From cyclones 13 the gas, at about 290° C, is drawn through a duct 14 into the space above the grate in upstream section 7, downwards through the bed in this section and into openings 15 leading by ducts represented schematically at 17 into dust separation cyclones 18 under the influence of another fan, not shown, exhausting to gas disposal plant at 19.

In the upstream section the action is predominantly the drying and preheating of the solids in the bed, while in the downstream section the action is mainly decarbonation and the commencement of calcination, which is completed later in the rotary kiln.

An auxiliary furnace, particularly a fluidised bed combustor 20, is supplied with fuel or other combustible material at 21, and with air at 22, to provide controlled burning yielding a desired quantity of gaseous combustion products at about 1000° C. These gaseous products are led by duct 23 into the downstream section 8 to provide additional heat to the bed. By directing the hot gases to the upstream part of the downstream section as indicated, one obtains optimum bed permeability. Ash discharged at 25 may in certain cases be used in the clinker. If desired, instead of obtaining the additional heat from a furnace, low grade fuel or disintegrated municipal refuse may be injected through a suitable inlet, for instance rotary valve 24.

Care is of course taken to ensure that the gas pressure distribution in the plant is not upset by the injection of material into section 8. In practice the addition of heat according to the invention renders the whole process more amenable to economic and efficient control.

What we claim is:

1. In the method of making Portland cement clinker which comprises the steps of continuously introducing Portland cement raw feed mix into the upstream compartment of a travelling grate device to form a travelling bed of raw feed mix which extends through said upstream compartment into and through a downstream compartment of the travelling grate device and discharges into the inlet end of a rotary cement kiln, continuously introducing fuel and combustion air into the discharge end of the rotary kiln while discharging the combustion products into said downstream compartment of the travelling grate device above said bed at a temperature in the order of 950° C, recovering Portland cement clinker from said discharge end of the kiln, withdrawing the combustion products from said downstream section to cause at least substantially all of the combustion products entering said downstream section from said kiln to pass downwardly through said travelling bed to effect partial decarbonation of said raw feed mix in said downstream section, and then passing the withdrawn combustion products into said upstream section to pass downwardly through said travelling bed therein thereby to preheat the raw feed mix, the improvement which comprises:
   (a) increasing the continuous feed of raw feed mix to said upstream section whereby to increase the throughput of said kiln;
   (b) decreasing the volume of gas passing through said kiln whereby the amount of dust passing into said downstream section is reduced; and
   (c) increasing the temperature in said downstream section over said bed by an amount of about 70–100° C to effect a sufficient increase in said decarbonation in said downstream section whereby to recover said Portland cement clinker from said discharge end of the kiln despite the increase in throughput of step (a), said increase in temperature being effected by incinerating refuse on top of said travelling bed within said downstream section of the travelling grate device.

2. In the method as defined in claim 1 wherein the increase in throughput of step (a) is in the order of 10–15% by weight and the decrease in gas velocity of step (b) is in the order of 30%.

3. In the method as defined in claim 2 wherein the decarbonation effected in step (c) is in the order of 80%.

* * * * *